Patented Apr. 27, 1943

2,317,949

UNITED STATES PATENT OFFICE 2,317,949

PRODUCTION OF ALCOHOLS

Robert E. Burk, Cleveland Heights, Ohio, assignor to The Standard Oil Company, Cleveland, Ohio, a corporation of Ohio No Drawing. Application December 28, 1939, Serial No. 311,387

7 Claims. (Cl. 260—638)

This invention relates to the manufacture of alcohol from hydrocarbon raw material, and more particularly by reaction upon olefins; and it is among the objects of the invention to provide specially effective reaction with an esterifying acid, also to provide improved hydrolysis and separation of the formed alcohol. Other objects and advantages will appear as the description proceeds.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

Olefin of suitable source or formed by cracking hydrocarbons, or as present in suitable concentration in gaseous mixtures, is passed into a reaction or absorbing zone where it is reacted with an esterifying acid. Instead of employing sulphuric acid as in the known processes, an acid may be employed forming volatilizable esters, as for instance acetic acid, etc. In some cases, an amount of concentrated sulphuric acid may also be present, and in general the reaction is carried on catalytically. Effective catalysts are titanium chloride, boron fluoride, aluminum chloride, silver sulphate, mercury sulphate, etc. The halogen-containing catalysts operate well with the esterifying acids generally. In some instances, it is desirable to also have present sulphuric or phosphoric acid or aryl sulphonic acid. The olefin or ethylene or ethylene-containing gas is passed into the esterifying acid in an absorbing zone or reaction zone, and usually a super-atmospheric pressure is advantageous, as for instance pressure of 100 to 250 pounds per square inch, and temperature between 0° C. and that tending to decomposition of the ester, as for instance 50 to 150° C. Thus, with the reaction zone or absorbing zone supplied with a mixture of concentrated acetic acid and sulphuric acid, the proportions of which former may be 5 to 95 per cent, and with an esterifying catalyst, preferably a halogen-containing compound also present, such as boron fluoride, the ethylene is brought into contact with acid. Acetic ester and sulphuric esters are formed. The sulphuric acid esters are relatively non-volatile, while the acetic ester volatilizes at around 70° C. Where the olefin is for instance propylene instead of ethylene, correspondingly a volatile ester is formed; and similarly with the succeeding higher olefins, butylene, etc., a corresponding ester is formed, and thus mixed olefins may be reacted, with appropriate temperatures and other conditions controlled, for successive volatile ester formation. The ester having been formed, it is removed, and is hydrolyzed. With conditions guarding against decomposition, as by use of a vacuum or by passing a gas stream through the liquid, the acetic ester is distilled off, without over-heating the acid mixture, and such distillation may be of continuous or batch-wise character as may be preferred. Where proceeding with such a volatile acid as the esterifying acid, the ethylene may be reacted with a concentrated solution thereof in the presence of a catalyst such as for instance titanium chloride and a hydrocarbon solvent for ethylene, as for instance a petroleum solvent.

In a case where ethylene has been reacted or esterified with concentrated sulphuric acid per se, I may react that solution with concentrated acetic acid and form a volatilizable ester, or the sulphuric acid solution containing sulphuric ester may be treated with a solvent to remove sulphuric esters, which are then reacted with for instance acetic acid. And, in some cases where sulphuric acid is desired for an initial stage, the olefin may be absorbed in the sulphuric acid, in general, and then be completely reacted with acetic acid to form a volatile ester and be finally distilled off and as such be further treated. In any event, the present advantage is in the formation and handling of esters which are volatile, in contrast to the customary sulphuric esters of non-volatile character.

The ester formed is separated, and since the esters in accordance with the invention are volatilizable, separation may be accomplished by applying sufficient heat to vaporize or distill off the ester. The ester is hydrolyzed with water. In hydrolyzing the ethyl ester to alcohol, I may, where preferred operate by limiting the amount of hydrolyzing water to substantially hydrolysis requirements, avoiding any material excess. Thus, for example, the hydrolyzing water may be supplied in proportion of one mol per mol of ester or slightly less of ester. The hydrolytic operation is also desirably carried out by passing the ester vapors into contact, as for instance counter current, with the hydrolyzing water, and advantageously a catalyst is present, i. e. any acid, such for example as acetic acid, as for instance 5 to 30 per cent. From the hydrolyzed product the ethyl alcohol is separated suitably. With ethyl acetate and water present there is formed a constant boiling ternary mixture of 60.1 mol per cent ethyl acetate, 12.4 mol per cent ethyl alcohol and 27.5 mol per cent of water, which distills over at 70.3° C. at atmospheric pressure, leaving as bottoms dilute acetic acid. I prefer to concentrate the latter, as by stripping with anhydrous ethyl acetate or passing the anhydrous ethyl acetate through the dilute acid and thereby removing water and concentrating the acid which is then returned to the reacting zone to react with fresh ethylene. The ethyl acetate and water mixture from the stripping operation is returned to the hydrolysis zone. And the ternary mixture of ethyl acetate, ethyl alcohol and water is desirably separated by using ethyl acetate as a stripping means. Or, the separation of the ternary mixture may be effected by such known methods as described in Chemical Industries 43, 625 (1938), or "Manual of Industrial Chemistry", vol. 2, 5th ed., pub. D. Van Nostrand Co., page 1155. In some cases I prefer however to provide a hydrocarbon in the hydrolysis mixture, such as amylene or hexane, or with very efficient fractionating equipment benzene or iso-heptane, and the alcohol and water therewith forms an azeotropic mixture, such that with amylene a definite cut boiling between 32 and 35° C. is taken off containing all of the amylene and part of the alcohol, then after a break in the boiling point to 70° C. a ternary mixture of ethyl acetate, ethyl alcohol and water is taken off and the alcohol separated.

Other modes of applying the principle of the invention may be employed, change being made as regards the details described, provided the features stated in any of the following claims, or the equivalent of such, be employed.

I therefore particularly point out and distinctly claim as my invention:

1. In a process of making alcohol, absorbing ethylene in a mixture of concentrated acetic and sulphuric acids at super-atmospheric pressure and temperature between 0° C. and decomposition temperature of the product, after acetate formation volatilizing and separating the ethyl acetate in the mixture under conditions avoiding over-heating, hydrolyzing the ester with water in amount limited to not substantially above hydrolytic requirements, distilling the resultant ethyl alcohol, stripping the residual liquid by passing therein anhydrous ethyl acetate and returning the concentrated acetic acid so produced to the absorbing zone, and returning the ethyl acetate and water mixture to the hydrolyzing zone.

2. In a process of making alcohol, absorbing ethylene in a mixture of concentrated acetic and sulphuric acids at super-atmospheric pressure and temperature between 0° C. and decomposition temperature of the product, after acetate formation volatilizing and separating the ethyl acetate in the mixture under conditions avoiding over-heating, hydrolyzing the ester with water in amount limited to not substantially above hydrolytic requirements, distilling off the alcohol from the mixture in the presence of amylene and separating amylene and alcohol, concentrating the acid residual liquid by passing anhydrous ethyl acetate therethrough, and returning the concentrated acid to the reaction zone and the diluted ester to the hydrolyzing zone.

3. In a process of making alcohol, absorbing ethylene in an esterifying acid providing acetic acid and forming an acetate, volatilizing and separating the acetate from the reaction mixture, hydrolyzing the acetate, distilling the resultant ethyl alcohol, concentrating the acid residual liquid by passing anhydrous ethyl acetate therethrough, and returning the concentrated acid to the reaction zone and the diluted ester to the hydrolyzing zone.

4. In a process of making alcohol, converting an olefin to a volatile ester by a volatile ester forming acid, separating the volatile ester from the reaction mixture and hydrolyzing the ester, distilling off the alcohol, and concentrating the acid residual liquid by passing therethrough anhydrous ester the same as the initially formed ester, and returning the concentrated acid to the reaction zone and the diluted ester to the hydrolyzing zone.

5. In a process of making alcohol, reacting upon ethylene with a volatile ester forming acid in the presence of titanium chloride and a hydrocarbon solvent for the ester, separating the volatile ester and hydrolyzing to alcohol, distilling off the alcohol, and concentrating the acid residual liquid by passing anhydrous ester the same as the initially formed ester therethrough, and returning the concentrated acid to the reaction zone and the diluted ester to the hydrolyzing zone.

6. In a process of making alcohol, reacting ethylene with a volatile ester forming acid in the presence of boron fluoride, separating the volatile ester and hydrolyzing to alcohol, distilling off the alcohol, and concentrating the acid residual liquid by passing anhydrous ester the same as the initially formed ester therethrough, and returning the concentrated acid to the reaction zone and the diluted ester to the hydrolyzing zone.

7. In a process of making alcohol, reacting an olefin with an esterifying acid capable of forming volatile esters to form a volatilizable ester, volatilizing and separating the ester, hydrolyzing the ester, distilling the resultant alcohol, concentrating the acid residual liquid by passing anhydrous ester the same as the initially formed ester therethrough, and returning the concentrated acid to the reaction zone and the diluted ester to the hydrolyzing zone.

ROBERT E. BURK.